(12) United States Patent
Narendra Trivedi et al.

(10) Patent No.: US 10,706,143 B2
(45) Date of Patent: Jul. 7, 2020

(54) TECHNIQUES FOR SECURE-CHIP MEMORY FOR TRUSTED EXECUTION ENVIRONMENTS

(71) Applicant: INTEL CORPORATION, Santa Clara, CA (US)

(72) Inventors: Alpa T. Narendra Trivedi, Hillsboro, OR (US); Siddhartha Chhabra, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 182 days.

(21) Appl. No.: 15/600,666

(22) Filed: May 19, 2017

(65) Prior Publication Data

US 2018/0336342 A1    Nov. 22, 2018

(51) Int. Cl.
| | |
|---|---|
| G06F 7/04 | (2006.01) |
| G06F 21/53 | (2013.01) |
| G06F 21/57 | (2013.01) |
| G06F 21/62 | (2013.01) |
| G06F 21/72 | (2013.01) |
| G06F 21/78 | (2013.01) |

(52) U.S. Cl.
CPC .............. *G06F 21/53* (2013.01); *G06F 21/57* (2013.01); *G06F 21/6281* (2013.01); *G06F 21/72* (2013.01); *G06F 21/78* (2013.01)

(58) Field of Classification Search
CPC ...... G06F 21/53; G06F 21/57; G06F 21/6281; G06F 21/72; G06F 21/78

USPC .......................................................... 726/27
See application file for complete search history.

(56) References Cited

U.S. PATENT DOCUMENTS

| 7,986,786 | B2 * | 7/2011 | Ibrahim | G06F 21/572 380/277 |
|---|---|---|---|---|
| 8,543,772 | B2 * | 9/2013 | Cota-Robles | G06F 12/1036 711/133 |
| 2005/0081199 | A1 * | 4/2005 | Traut | G06F 9/45554 718/1 |
| 2009/0300333 | A1 * | 12/2009 | Harper, III | G06F 9/3004 712/220 |
| 2012/0166767 | A1 * | 6/2012 | Patel | G06F 9/30032 712/205 |
| 2016/0117519 | A1 * | 4/2016 | Hashii | G06F 16/183 713/166 |
| 2018/0046502 | A1 * | 2/2018 | Zimmer | G06F 9/4856 |

* cited by examiner

*Primary Examiner* — Samson B Lemma

(57) ABSTRACT

Techniques for secure-chip memory for trusted execution environments are described. A processor may include a memory configured to interface with a trusted execution environment. The processor may be configured to indicate to a trusted execution environment that the memory supports dedicated access to the trusted execution environment. The processor may receive an instruction from the trusted execution environment. The processor may enforce an access control policy of an interface plugin to limit access of the memory by the trusted execution environment to a partition of the memory associated with the trusted execution environment. Other embodiments are described and claimed.

25 Claims, 13 Drawing Sheets

Indicate to a trusted execution environment that a memory supports dedicated access to the trusted execution environment
802

↓

Receive an instruction from the trusted execution environment
804

↓

Enforce an access control policy of an interface plugin to limit access of the memory by the trusted execution environment to a partition of the memory associated with the trusted execution environment
806

TECHNIQUES FOR SECURE-CHIP MEMORY FOR TRUSTED EXECUTION ENVIRONMENTS

FIELD OF THE DISCLOSURE

The disclosure generally relates to techniques for providing secure-chip memory for trusted execution environments.

BACKGROUND

In some devices utilizing trusted execution environments (TEE), sensitive portions of an application may be executed and/or stored in a secure environment, called an enclave, to protect both code and data from compromise. However, unlike conventional application environments, enclaves may not retain data after a device has entered certain sleep states. While many machines may include off-chip persistent storage that can be used by an enclave, it does not provide the level of security necessary to maintain the secure environment of an enclave. Thus, improved techniques for secure-chip memory for trusted execution environments are desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Techniques for secure-chip memory for trusted execution environments are described. A processor may include a memory configured to interface with a trusted execution environment. The processor may be configured to indicate to the trusted execution environment that the memory supports dedicated access to the trusted execution environment. The processor may receive an instruction from the trusted execution environment. The processor may enforce an access control policy of an interface plugin to limit access of the memory by the trusted execution environment to a partition of the memory associated with the trusted execution environment. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates a logic flow according to an embodiment.

DETAILED DESCRIPTION

Figure 1:
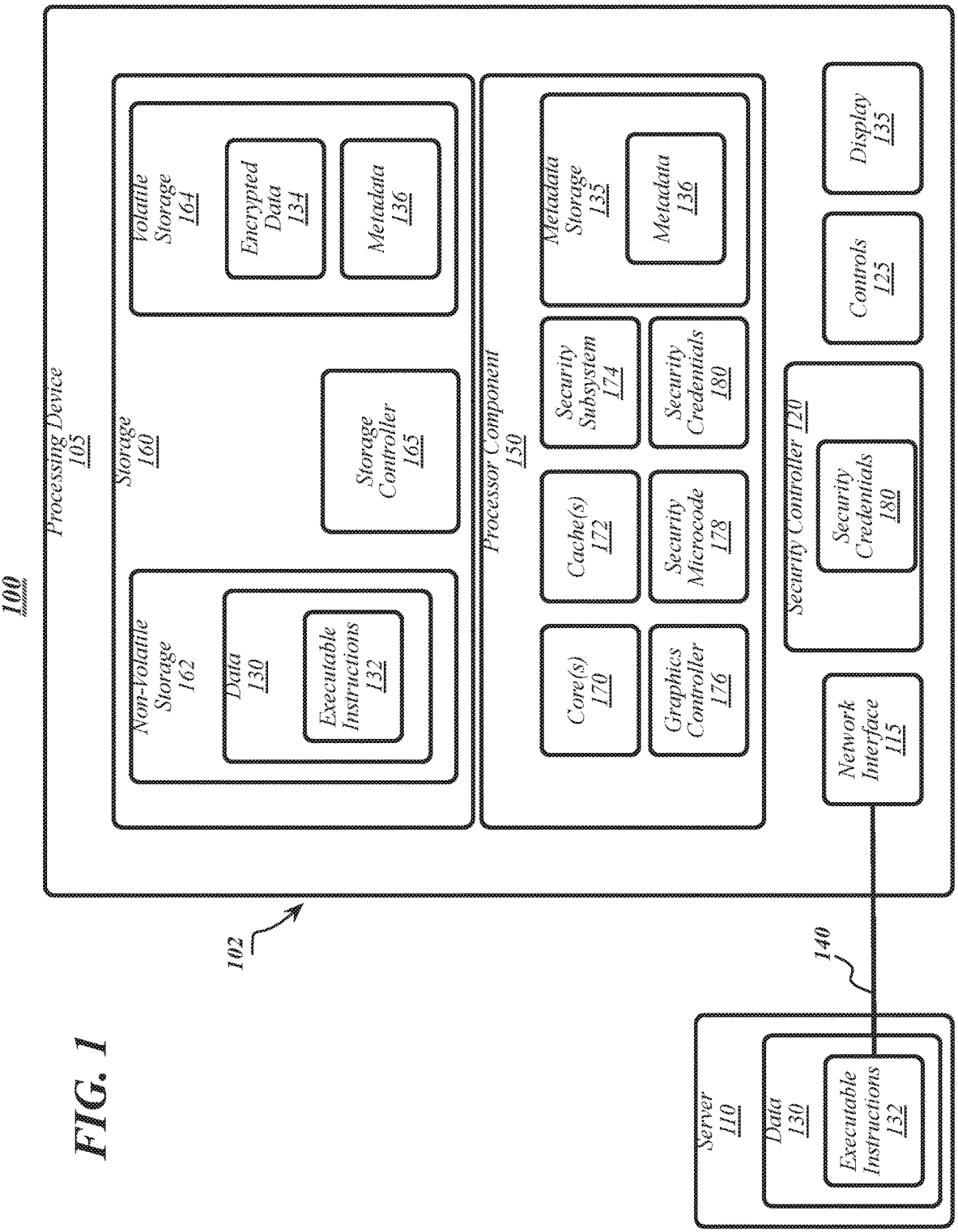
FIG. 1 illustrates an embodiment of an operating environment.

Techniques for secure-chip memory for trusted execution environments are described. A processor may include a memory configured to interface with a trusted execution environment. The processor may be configured to indicate to the trusted execution environment that the memory supports dedicated access to the trusted execution environment. The processor may receive an instruction from the trusted execution environment. The processor may enforce an access control policy of an interface plugin to limit access of the memory by the trusted execution environment to a partition of the memory associated with the trusted execution environment. Other embodiments are described and claimed.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

FIG. 1 illustrates an example of an operating environment 100 such as may be representative of some embodiments. In operating environment 100, which may include secure-chip memory for trusted execution environments, a system 102 may include a server 110 and a processing device 105 coupled via a network 140. Server 110 and processing device 105 may exchange data 130 via network 140, and data 130 may include executable instructions 132 for execution within processing device 105. In some embodiments, data 130 may be include data values, executable instructions, and/or a combination thereof. Network 140 may be based on any of a variety (or combination) of communications technologies by which signals may be exchanged, including without limitation, wired technologies employing electrically and/or optically conductive cabling, and wireless technologies employing infrared, radio frequency, and/or other forms of wireless transmission.

In various embodiments, processing device 105 may incorporate a processor component 150, a storage 160, controls 125 (for instance, manually-operable controls), a display 135 and/or a network interface 115 to couple processing device 105 to network 140. Processor component 150 may incorporate security credentials 180, a security microcode 178, metadata storage 135 storing metadata 136, a security subsystem 174, one or more processor cores 170, one or more caches 172 and/or a graphics controller 176. Storage 160 may include volatile storage 164, non-volatile storage 162, and/or one or more storage controllers 165. Processing device 105 may include a controller 120 (for example, a security controller) that may include security credentials 180. Controller 120 may also include one or more of the embodiments described herein for unified hardware acceleration of hash functions.

Volatile storage 164 may include one or more storage devices that are volatile in as much as they require the continuous provision of electric power to retain information stored therein. Operation of the storage device(s) of volatile storage 164 may be controlled by storage controller 165, which may receive commands from processor component 150 and/or other components of processing device 105 to store and/or retrieve information therein, and may convert those commands between the bus protocols and/or timings by which they are received and other bus protocols and/or timings by which the storage device(s) of volatile storage 164 are coupled to the storage controller 165. By way of example, the one or more storage devices of volatile storage 164 may be made up of dynamic random access memory (DRAM) devices coupled to storage controller 165 via an interface, for instance, in which row and column addresses, along with byte enable signals, are employed to select storage locations, while the commands received by storage controller 165 may be conveyed thereto along one or more pairs of digital serial transmission lines.

Non-volatile storage 162 may be made up of one or more storage devices that are non-volatile inasmuch as they are able to retain information stored therein without the continuous provision of electric power. Operation of storage device(s) of non-volatile storage 162 may be controlled by storage controller 165 (for example, a different storage controller than used to operate volatile storage 164), which may receive commands from processor component 150 and/or other components of processing device 105 to store and/or retrieve information therein, and may convert those commands between the bus protocols and/or timings by which they are received and other bus protocols and/or timings by which the storage device(s) of non-volatile storage 162 are coupled to storage controller 165. By way of example, one or more storage devices of non-volatile storage 162 may be made up of ferromagnetic disk-based drives (hard drives) operably coupled to storage controller 165 via a digital serial interface, for instance, in which portions of the storage space within each such storage device are addressed by reference to tracks and sectors. In contrast, commands received by storage controller 165 may be conveyed thereto along one or more pairs of digital serial transmission lines conveying read and write commands in which those same portions of the storage space within each such storage device are addressed in an entirely different manner.

Processor component 150 may include at least one processor core 170 to execute instructions of an executable routine in at least one thread of execution. However, processor component 150 may incorporate more than one of processor cores 170 and/or may employ other processing architecture techniques to support multiple threads of execution by which the instructions of more than one executable routine may be executed in parallel. Cache(s) 172 may include a multilayer set of caches that may include separate first level (L1) caches for each processor core 170 and/or a larger second level (L2) cache for multiple ones of processor cores 170.

In some embodiments in which processing device 105 includes display 135 and/or graphics controller 176, one or more cores 170 may, as a result of executing the executable instructions of one or more routines, operate controls 125 and/or the display 135 to provide a user interface and/or to perform other graphics-related functions. Graphics controller 176 may include a graphics processor core (for instance, a graphics processing unit (GPU)) and/or component (not shown) to perform graphics-related operations, including and not limited to, decompressing and presenting a motion video, rendering a 2D image of one or more objects of a three-dimensional (3D) model, etc.

Non-volatile storage 162 may store data 130, including executable instructions 132. In the aforementioned exchanges of data 130 between processing device 105 and server 110, processing device 105 may maintain a copy of data 130, for instance, for longer term storage within non-volatile storage 162. Volatile storage 164 may store encrypted data 134 and/or metadata 136. Encrypted data 134 may be made up of at least a portion of data 130 stored within volatile storage 164 in encrypted and/or compressed form according to some embodiments described herein. Executable instructions 132 may make up one or more executable routines such as an operating system (OS), device drivers and/or one or more application routines to be executed by one or more processor cores 170 of processor component 150. Other portions of data 130 may include data values that are employed by one or more processor cores 170 as inputs to performing various tasks that one or more processor cores 170 are caused to perform by execution of executable instructions 132.

As part of performing executable instructions 132, one or more processor cores 170 may retrieve portions of executable instructions 132 and store those portions within volatile storage 164 in a more readily executable form in which addresses are derived, indirect references are resolved and/or links are more fully defined among those portions in the process often referred to as loading. As familiar to those skilled in the art, such loading may occur under the control of a loading routine and/or a page management routine of an OS that may be among executable instructions 132. As portions of data 130 (including portions of executable instructions 132) are so exchanged between non-volatile storage 162 and volatile storage 164, security subsystem 174 may convert those portions of data 130 between what may be their original uncompressed and unencrypted form as stored within non-volatile storage 162, and a form that is at least encrypted and that may be stored within volatile storage 164 as encrypted data 134 accompanied by metadata 136.

Security subsystem 174 may include hardware logic configured or otherwise controlled by security microcode 178 to implement the logic to perform such conversions during normal operation of processing device 105. Security microcode 178 may include indications of connections to be made between logic circuits within the security subsystem 174 to form such logic. Alternatively or additionally, security microcode 178 may include executable instructions that form such logic when so executed. Either security subsystem 174 may execute such instructions of the security microcode 178, or security subsystem 174 may be controlled by at least one processor core 170 that executes such instructions. Security subsystem 174 and/or at least one processor core 170 may be provided with access to security microcode 178 during initialization of the processing device 105, including initialization of the processor component 150. Further, security subsystem 174 may include one or more of the embodiments described herein for unified hardware acceleration of hash functions.

Security credentials 180 may include one or more values employed by security subsystem 174 as inputs to its performance of encryption of data 130 and/or of decryption of encrypted data 134 as part of performing conversions there between during normal operation of processing device 105. More specifically, security credentials 180 may include any of a variety of types of security credentials, including and not limited to public and/or private keys, seeds for generating random numbers, instructions to generate random numbers, certificates, signatures, ciphers, and/or the like. Security subsystem 174 may be provided with access to security credentials 180 during initialization of the processing device 105.

Figure 2:
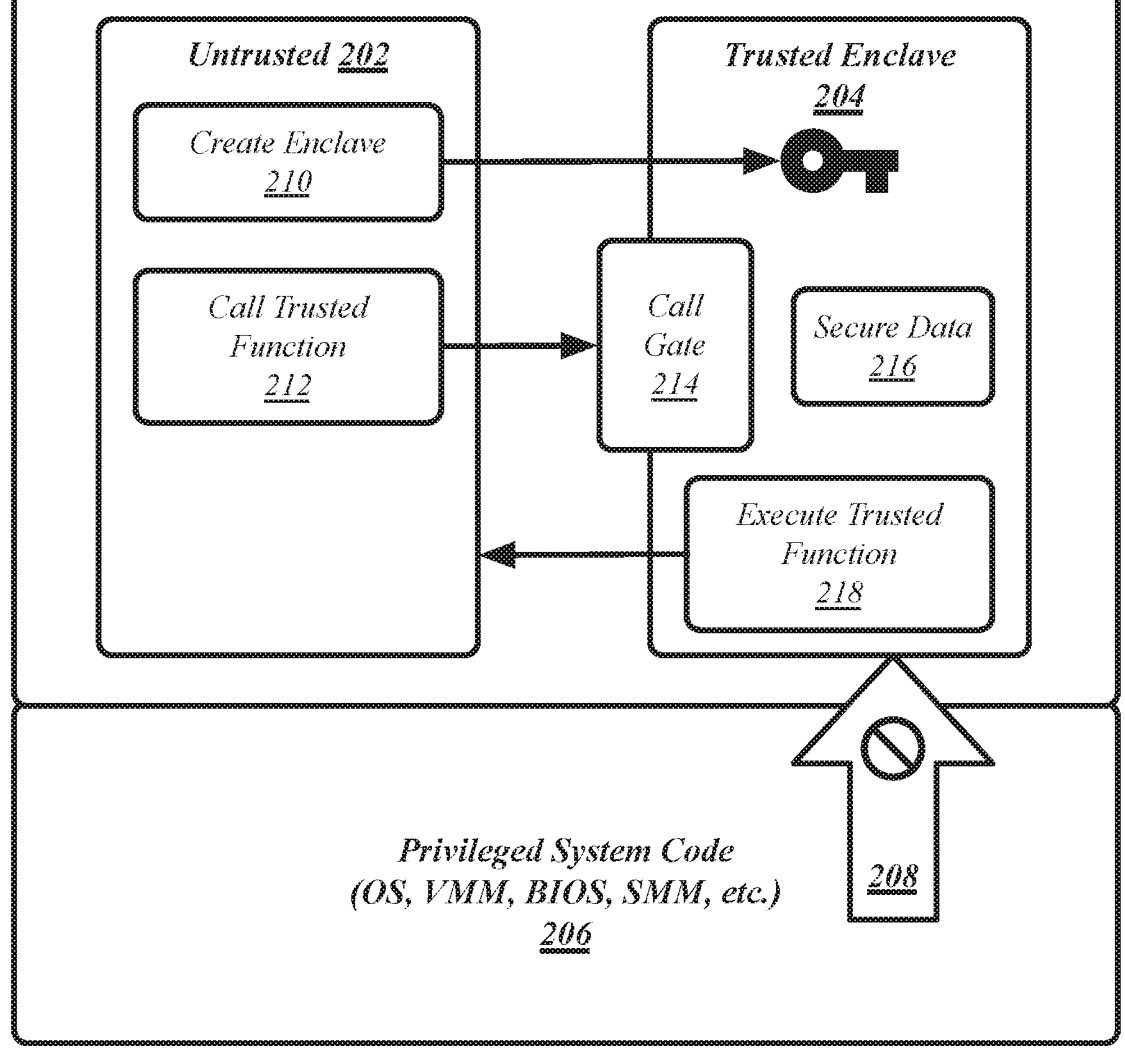
FIG. 2 illustrates an embodiment of a trusted execution environment.

FIG. 2 illustrates an embodiment of a trusted enclave system 200, which may be used in some embodiments described herein. Trusted enclave system 200 may include application 201, which may include one or more applications executing on a software and/or hardware platform. A few non-limiting examples of applications that may include secret data in need of protection are financial applications, electronic banking applications, and health or medical applications. In some embodiments, application 201 may include an untrusted partition 202, which may be a partition of application 201 that includes instructions and data that are generally unprotected from an attack. Privileged code 206 may include code of a platform that has special access, or privilege, to data within applications running on the platform. Privileged code may include the operating system, a virtual machine manager, system BIOS, or system management mode, for example. While these exemplary types of privileged code may be used here, it can be appreciated that other types of code may permanently or temporarily include privilege.

If malicious code were to infect privileged system code 206, it may have access to untrusted partition 202, since privileged system code 206 generally has access to application 201. Using a trusted enclave system, however, certain data may be kept secret and secure, even from an attack originating from privileged system code 206. In an example, application 201 may create a trusted enclave 204 at 210 to protect secret data and secure data 216. The creation of a trusted enclave 204 may generate a secure memory location, sometimes within a processor of a platform, accessible using the techniques described herein. Trusted enclave 204 may be configured to support certain trusted functions that may execute on secure data 216. Untrusted partition 202 may call a trusted function at 212 using a call gate 214, which may be a combination of software and hardware configured to accept certain trusted function calls at trusted enclave 204. The resulted of a trusted function call may be returned from trusted enclave 204 to untrusted partition 202, while secure data 216 remains protected within trusted enclave 204. In this manner, secure data 216 may be accessed using a limited set of trusted functions, secure data 216 may still be used within application 201, however, as shown by blockage 208, privileged system code 208 may be prevented from accessing secure data 216. In some embodiments described herein, secure data 216 may be stored within on-chip persistent memory, such as NVRAM, and may be partitioned such that each partition is associated with a particular trusted execution environment.

Trusted enclave system 200 allows for each application running on a platform to defend its own secret data using secure enclaves, significantly reducing the attack surface available to malicious code, especially malicious code that has infiltrated privileged system code 206. While the embodiment described within FIG. 2 illustrates a single platform, trusted enclave systems may be used within networked distributed systems, such as IoT. In these systems, as described later, a centralized trusted authority may be used to authenticate secure enclaves.

Figure 3:
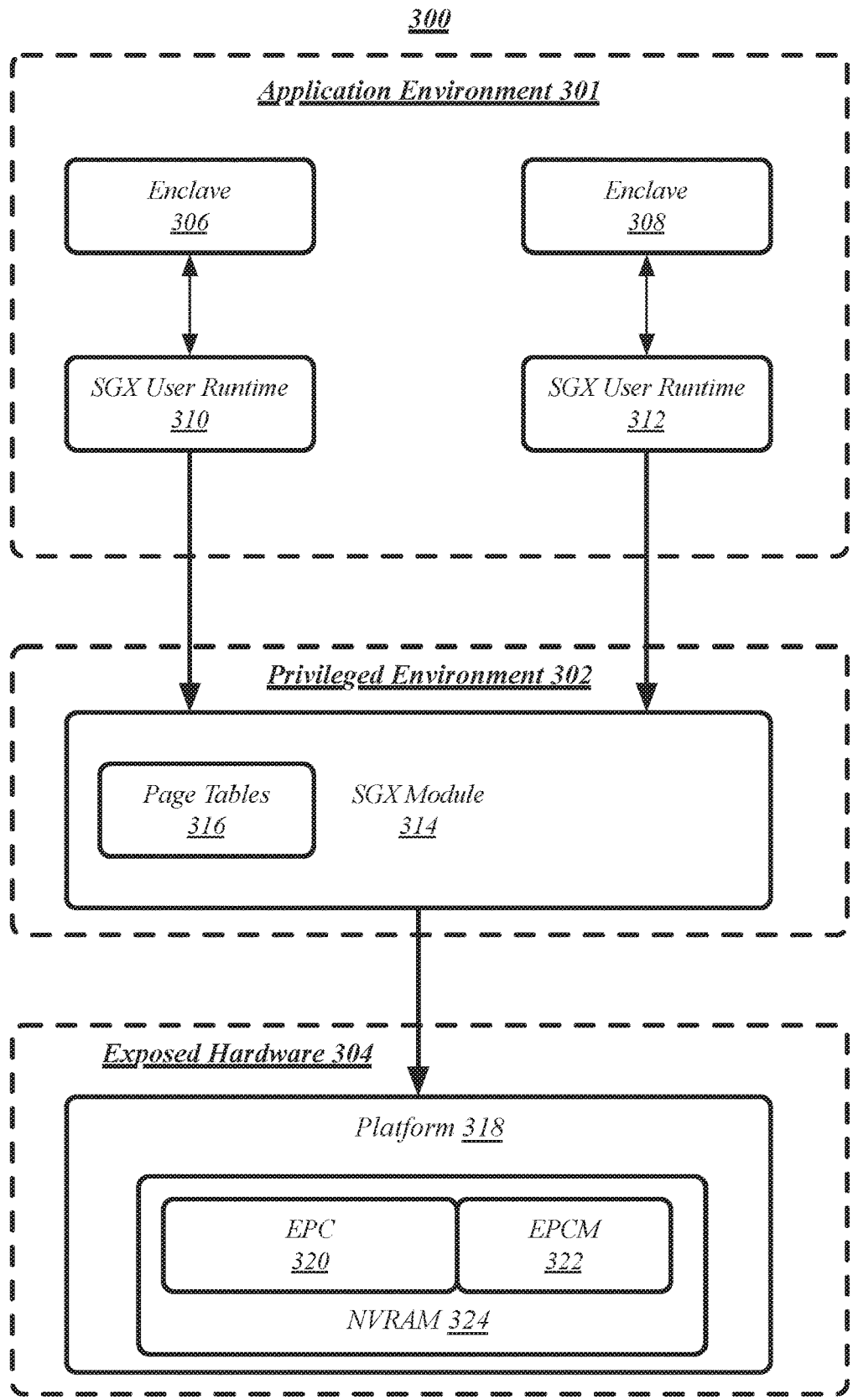
FIG. 3 illustrates an architecture of a trusted execution environment.

FIG. 3 illustrates an architecture of a trusted enclave system 300. Trusted enclave system 300 may include an application environment 301, privileged environment 302, and exposed hardware 304, each discussed in turn now. Application environment 301 may include one or more enclaves, 306, 308, each accessed using one or more SGX user runtime modules 310, 312. In this manner, each enclave 306, 308, may be accessed in a secure manner by privileged environment 302. Privileged environment 302 may include an SGX module 314, and pages tables 314. SGX module 314 may include a combination of software and hardware, and may be configured to request secret information, or perform trusted functions on secret information, from an enclave 306, 308 via SGX user runtimes 310, 312. Page tables 316 may store one or more memory locations for secret data stored within exposed hardware 304, for example. Exposed hardware 304 may include a computing platform 318, as described herein, and may include one or more processors configured to perform the techniques set forth within.

Platform 318 may include a storage device, NVRAM 324, storing enclave page cache (EPC) 320 and enclave page cache map (EPCM) 322. EPC 320 may be a memory that includes a structure EPCM 322 for associating a set of access permissions with an enclave. EPC 320 may contain protected code and data in pages, which in some embodiments may be 4 KB pages in a non-limiting example. EPC 320 may store enclave pages and SGX structures, and EPC pages may be valid or invalid. A valid EPC page may contain either an enclave page or an SGX structure. The security attributes for each EPC page may be held in an internal micro-architecture structure called EPCM, discussed below.

EPCM 322 may contain metadata of enclave pages and may be a protected structure used by a processor to track the contents of EPC 320. EPCM 322 may be comprised of a series of entries with exactly one entry for each page in EPC 320. It can be appreciated that alternate embodiments may not require a 1:1 correlation. EPCM 322 may be managed by the processor as part of various SGX instructions and may not be directly accessible to software or to devices. The format of EPCM 322 may be microarchitectural and is implementation dependent. However, logically, each EPCM entry may hold one or more of the following: whether the EPC page is valid or invalid; the enclave instance that owns the page; the type of page (REG, TCS, VA, SECS); the virtual address through which the enclave can access the page; the enclave specified read/write/execute permissions on that page; and/or whether the page is accessible or not (BLOCKED or UNBLOCKED). The EPCM structure may be used by the processor in the address translation flow to enforce access-control on the enclave pages loaded into the EPC. Logically it may provide an additional secure layer of access control in addition to "legacy" segmentation, paging tables, and extended paging tables mechanisms.

Figure 4:
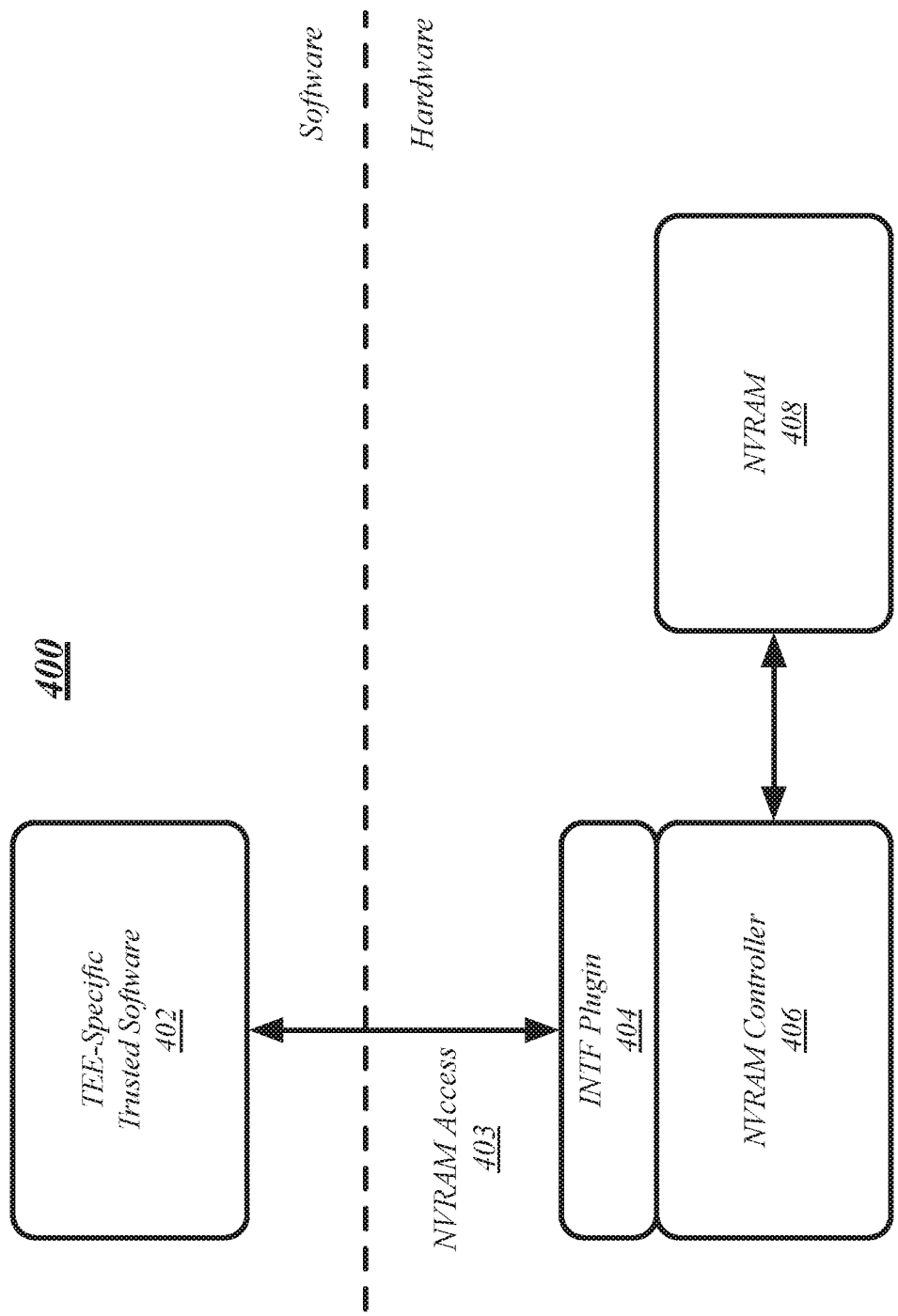
FIG. 4 illustrates an embodiment of a system.

FIG. 4 illustrates a block diagram for a system 400. In one embodiment, the system 400 may comprise one or more components. Although the system 400 shown in FIG. 4 has a limited number of elements in a certain topology, it may be appreciated that the system 400 may include more or less elements in alternate topologies as desired for a given implementation. The system 400 may include a plurality of modules, which may each include one or more processing units, storage units, network interfaces, or other hardware and software elements described in more detail herein. In some embodiments, these modules may be included within a single device. In other embodiments, one or more modules may be part of a distributed architecture, an example of which is described with respect to FIG. 11.

In an embodiment, each module of system 400 may comprise without limitation, a mobile computing device, a smart phone, a cellular telephone, a device connected to the Internet of Things (IoT), a handset, a personal digital assistant, a one-way pager, a two-way pager, a messaging device, a computer, a personal computer (PC), a desktop computer, a laptop computer, a notebook computer, a handheld computer, a tablet computer, or a wearable computing device such as a smart watch. Further, modules may include a server, which may comprise without limitation a single server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, system 400 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 400, and components and/or modules within a device of system 400, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the various modules and storages of system 400 may be organized as a distributed system. A distributed system typically comprises multiple autonomous computers that communicate through a computer network. The computers may interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

Embodiments described herein describe techniques for a trusted execution environment (SGX as one example) to access a dedicated on-chip memory, such as NVRAM, to provide improved security guarantees with performance benefits. While examples such as SGX and NVRAM may be used herein to describe certain embodiments, it can be appreciated that other trusted execution environments and storage devices may be used in some embodiments. Exemplary benefits may include state-recoverability capabilities for secure enclaves, enabled in part by storing security-sensitive data, such as keys, in a secure and persistent manner. In addition, performance of a trusted execution environment may be improved due to the inclusion of on-chip storage. Further, securely and persistently maintaining TEE-related data may allow for a state save for services such as monotonic counters, which provide replay protection to persistent storage across reset cycles to enable applications such as digital rights management (DRM), for example. The monotonic counter service may be provided as part of SGX platform services, and may require a replay protected persistent storage to store a root-hash associated with the monotonic counters. With the proposed disclosed techniques, on-chip NVRAM may be used as the persistent storage.

As another example of a benefit, the on-chip NVRAM may be used to store the key wrapping key (KWK) that is used by an enclave via EBIND instruction to generate wrapped blobs, which may, in turn, be used by enclaves to communicate securely to various devices on a platform. This may allows the blobs to be saved and restored across sleep states. Additionally, the storage can also help reduce the TCB for SGX TEE by providing storage for platform services metadata.

Turning to the elements illustrated within FIG. 4, system 400 may include trusted execution environment-specific software module 402, located on the software side of the system 400. TEE 402 may include a virtual memory management application, SGX, or other type of TEE. In an embodiment, TEE 402 may include a client application, which may be running on a client device as described herein, may execute and/or store data using a secure enclave, such as SGX enclave. SGX enclaves may reside on one or more processors of a client device in some embodiments. While specific examples are used throughout, the techniques described may be used with any processor within various types of trusted execution environments.

In some embodiments, multiple TEEs of the same or of various types may be used with the techniques described herein. For example, utilizing one or more instruction set architecture (ISA) extensions, described in detail herein, techniques may provide exclusive access 403 to on-chip NVRAM 408 for multiple distrusting TEEs (e.g., SGX, VMM). The proposed on-chip NVRAM 408 may be bound to a specific TEE 402 by system BIOS to provide exclusive access for the TEE 402 to store secrets or security sensitive data to be persistent across deeper sleep states like (S3/S4, for example) as part of the platform manufacturing process. TEE 402 may require secure state retention across sleep states for its operation. As an example, saving or restoring keys and other secret data across S3/S4 sleep states may allow an application running inside a TEE 402 to operate seamlessly across sleep states.

NVRAM 408 may be present on the hardware side of system 400, and may be present within a processor of system 400 in some embodiments. While NVRAM is used as an exemplary embodiment, other types of storage devices may be used in other embodiments. NVRAM 408 may be configured consistent with FIG. 5, in some embodiments. In particular, NVRAM 408 may be partitioned for one or more TEEs, with each partition providing a static memory range for an associated TEE. In this manner, multiple TEEs may have access to NVRAM 408, without providing access to other applications, or other TEEs.

Management of each NVRAM partition, and access control may be provided by NVRAM controller 406, which may be configured to control access 403 to data stored within NVRAM 408, via interface plugin 404. Techniques described herein utilizing ISA extensions may allow trusted execution environment-specific software module 402 access on-chip NVRAM 408 that is otherwise hidden from other system software and the operating system. While some embodiments described herein utilize specific instructions for certain TEEs, it can be appreciated that a single instruction set may be used for multiple types of TEEs in certain implementations. NVRAM controller 406 may be configured to send an indication to a TEE indicating that it supports dedicated on-chip memory access for TEEs. For example, a CPUID may be sent, or made available via feature flags in the CPUID to allow a TEE to discover the support for the techniques described herein.

Interface plugin 404 may be configured receive instructions from TEE 402 and may check a mode of operation for the execution of an instruction to ensure which TEE is accessing the NVRAM 408. For example, if the instruction is executed while running inside an enclave, interface plugin 404 may check against enclave instructions, and running in VMX mode, interface plugin 404 may check against VMM instructions. In an embodiment, interface plugin 404 may be configured to limit execution of instructions to one particular enclave, or subset of enclaves (using SGX as an example). In this case, interface plugin 404 may be configured by pre-provisioning a measurement of the enclave that is allowed to execute an instruction and the instruction can be configured to verify that the measurement of the calling enclave is the same as the pre-provisioned measurement.

On-chip NVRAM 408, in an embodiment, may be uCode-exclusive and may be viewed as a RAM module with interface plugin 404 configured as the gatekeeper of NVRAM controller 406. Of course, uCode exclusivity may not be required in all embodiments. When required, uCode may be the only agent trusted by NVRAM controller 406 and, thus, TEE 402 may be required to invoke uCode in order to access NVRAM 408 via targeted instructions adhering to the access-control policies configured in the interface plugin 404.

Interface plugin 404 may be responsible for enforcing access control policies tied to a specific TEE in hardware, accessed via targeted entry points like specific instructions. The access control policies may be associated with partitions in NVRAM 408 to allow different TEEs to control different partitions. Access control policies for the interface plugin 404 may include static read and write policies to be checked on all read/write transactions, which may be set during boot-time by BIOS. These policies may not be re-configured dynamically during runtime execution, in some embodiments.

For each TEE, an access control policy may use the following information:

TEE-ID: An identifier used by the interface plugin 404 to enforce access control policies and check for the allowing the TEE-NVRAM access.

TEE-INSTRUCTIONS: A set of instructions that may only be executed by that TEE.

TEE-RANGE: A range register for defining a memory range in NVRAM for the TEE.

Interface plugin 404 may use at least the information above to enforce access policies for particular TEEs requesting access to a partition of NVRAM 408. For example, interface plugin 404 may be configured to check if the NVRAM address belongs to the TEE generating the request. If interface plugin 404 detects an access error, it may will drop the request and send back an error response to the TEE.

Figure 5:
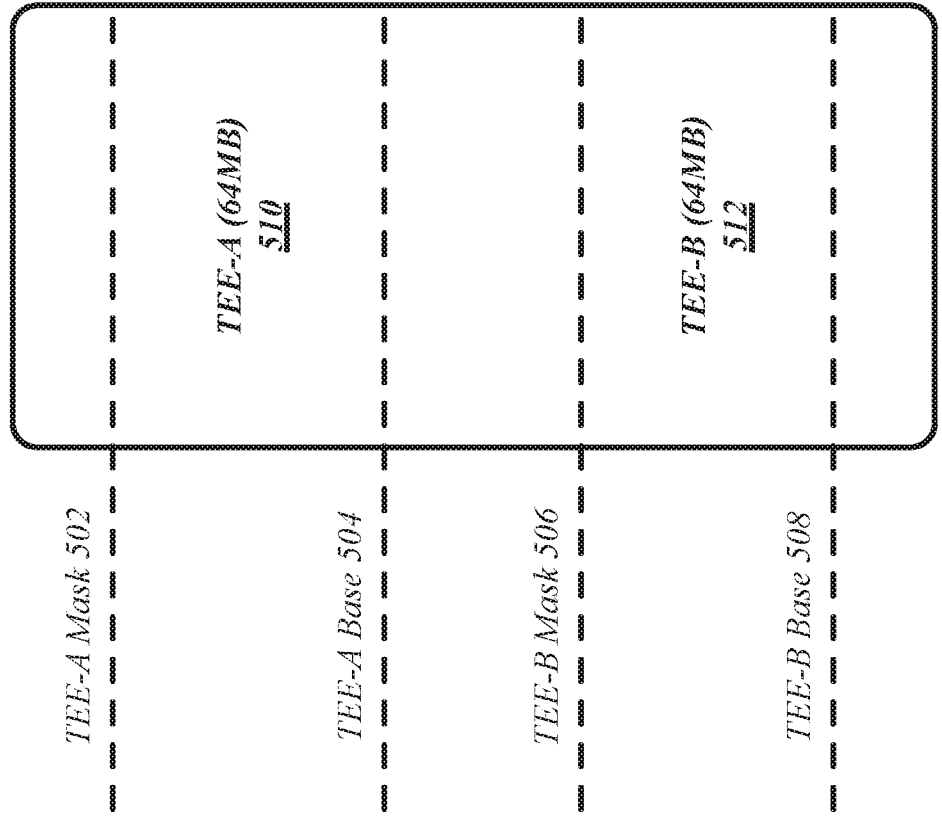
FIG. 5 illustrates a memory system according to an embodiment.

FIG. 5 illustrates a memory system 500 according to an embodiment. In this example, memory system includes an on-chip NVRAM, which may be partitioned into static memory ranges, each associated with a TEE. In an embodiment, system BIOS may partition available NVRAM into supported memory ranges for each known TEE via TEE-specific base/mask memory partitioning services (such as MSRs). In an embodiment, partitioning may be performed such that partitioned memory ranges are non-overlapping ranges to enforce isolation and security. One or more range registers may have a lock bit and, once set, it may not be changed. During partitioning by BIOS, a memory partitioning flow may be configured to check for a lock bit and, if set, give a GP fault. If not set, it may be configured to check other range registers to ensure that the other range is locked. A memory partitioning flow may be configured to determine that a range value being programmed into on-chip NVRAM 500 for a TEE does not overlap with the locked value in the other range. When BIOS completes partitioning, on-chip NVRAM 500 may be locked and each respective partition may be accessed by a corresponding TEE.

In a non-limiting example, FIG. 5 illustrates hardware including a 256 MB on-chip NVRAM 500 configured to support a first TEE-A (64 MB) 520 between TEE-A Mask 502 and TEE-Base 504 and a second TEE-B (64 MB) 512 between TEE-B Base 506 and TEE-B Base 508. An interface plugin may be configured to check the attributes for each transaction access to on-chip NVRAM 500, using the techniques described herein.

NVRAM 500 may be configured as part of a platform manufacturing process. Accordingly, access to NVRAM 500 may be limited to a particular agent, such as uCode. As configured according to the techniques described herein, each TEE may only be aware of the NVRAM registers associated with it and may have no information regarding the complete NVRAM configuration. Thus, each TEE may not be capable of maliciously, or accidentally, accessing another TEE's NVRAM region.

Figure 6:
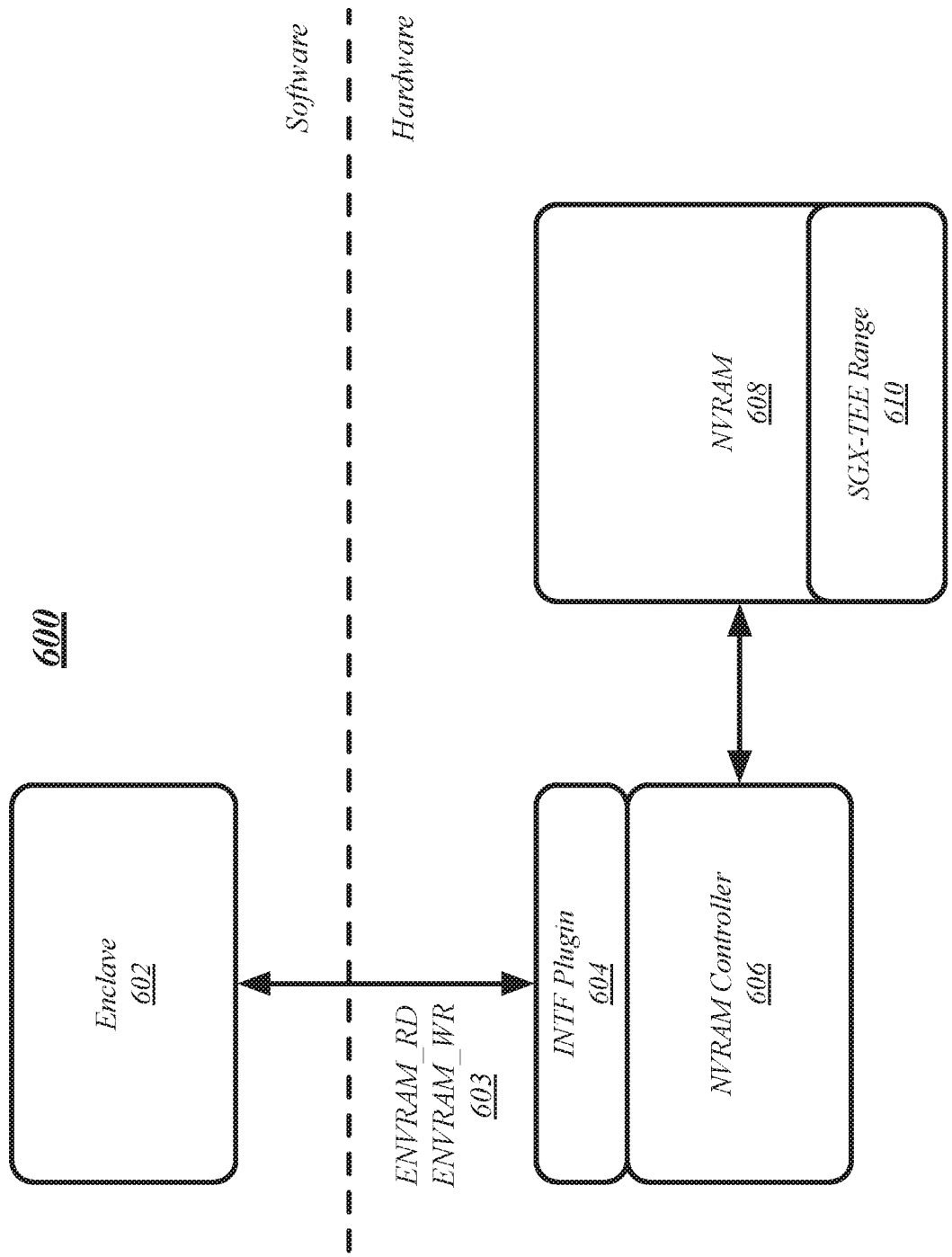
FIG. 6 illustrates an embodiment of a system.

FIG. 6 illustrates a system 600 according to an embodiment. System 600 may include an SGX enclave 602, located on the software side of the system 600. SGX Enclave 602 may be configured to access 603 a particular SGX-TEE memory range 610 of NVRAM 608 on the hardware side of system 600 via interface plugin 604 and NVRAM controller 606. System 600 largely functions in accordance with the techniques described above with respect to FIG. 4.

Techniques described herein may include instructions for different types of TEEs. The embodiment illustrated within FIG. 6 specifically is directed to SGX and enclave 602. In an exemplary embodiment, two instructions may be executed only by an allowed enclave. In this example, instructions ENVRAM_RD (read) and ENVRAM_WR (write) may be specifically used by SGX. Using these instructions, other functions such as a launch enclave function may use the on-chip memory to save critical information needed for save-restore of all enclaves, in an example.

The ENVRAM_WR instruction may be a Ring 3 instruction (leaf of ENCLU) and may allow a specific enclave to perform a write into a specific memory range of NVRAM 608. In an example, the write may be limited to 64 MB. The ENVRAM_WR instruction may include the following parameters, with exemplary values:

DS:EAX: wr_addr<32b address>
DS:EBX: wr_data0<32b write value>
DS:ECX: wr_data1<32b write value>

The ENVRAM_RD instruction may be a Ring 3 instruction (leaf of ENCLU) and may allow a specific enclave to perform a read into a specific memory range of NVRAM 608. In an example, the read may be limited to 64 MB. The ENVRAM_RD instruction may include the following parameters, with exemplary values:

DS:EAX: rd_addr<32b read address>
DS:EBX: rd_data0<32b read return value>
DS:ECX: rd_data1<32b read return value>

Figure 7:
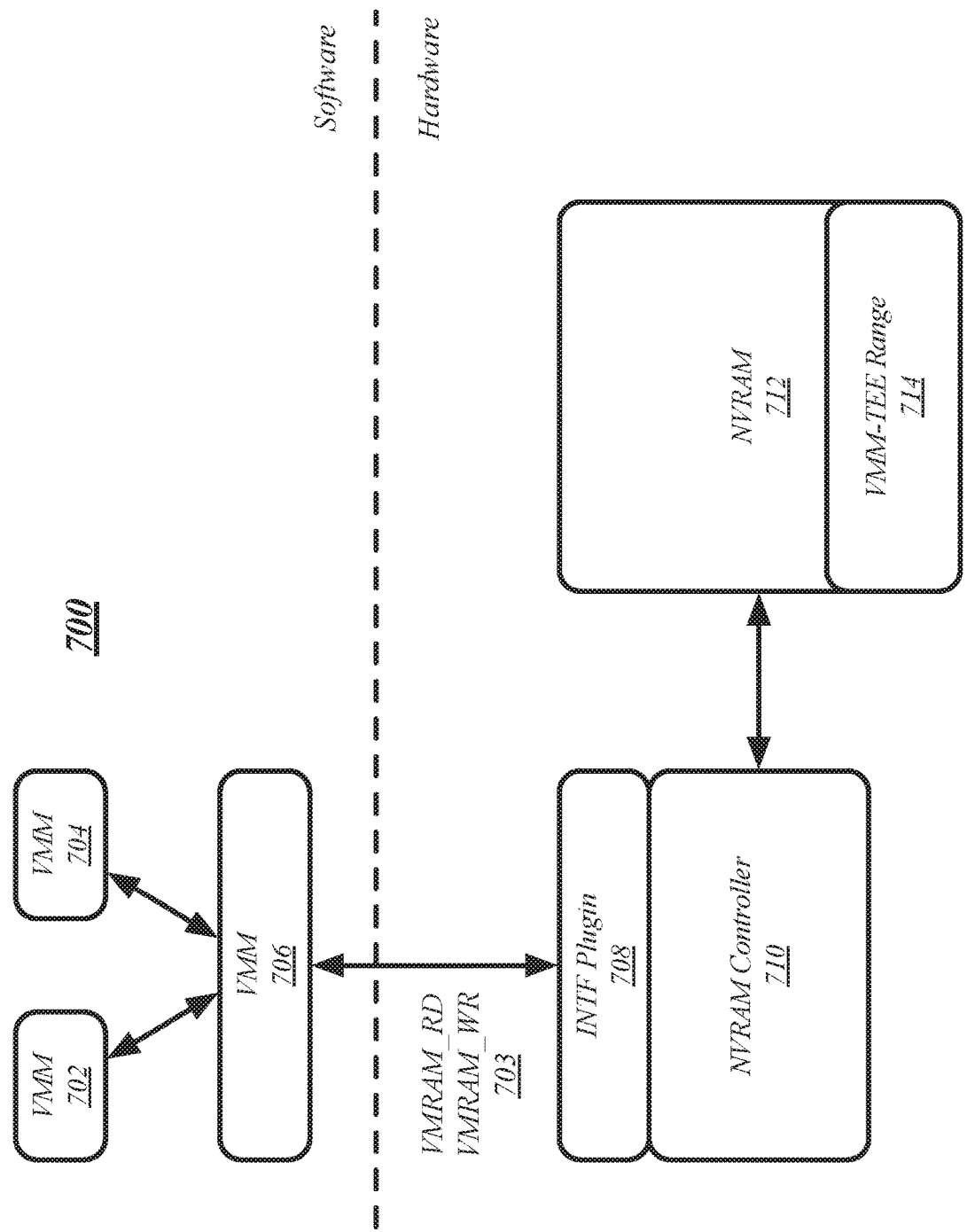
FIG. 7 illustrates an embodiment of a system.

FIG. 7 illustrates a system 700 according to an embodiment. System 700 may include an a VMM 706 corresponding to multiple VMMs 702 and 704 located on the software side of the system 700. While two VMMs 702 and 704 are illustrated, it can be appreciated that more or less may be used. Further, while FIG. 6 illustrates SGX and FIG. 7 illustrates VMM, it can be appreciated that SGX, VMM and other types of TEE may coexist in certain embodiments. VMM 706 may be configured to access 703 a particular SGX-TEE memory range 714 of NVRAM 712 on the hardware side of system 700 via interface plugin 708 and NVRAM controller 710. System 700 largely functions in accordance with the techniques described above with respect to FIG. 4.

Techniques described herein may include instructions for different types of TEEs. The embodiment illustrated within FIG. 7 specifically is directed to VMM 706. In an exemplary embodiment, two instructions may be executed only by an allowed VMM. In this example, instructions VMVRAM_RD (read) and VMVRAM_WR (write) may be specifically used by VMM 706, and may only be used in VM<M-root mode, in some embodiments. Using these instructions, other functions such as a launch enclave instruction may use the on-chip memory to save critical information needed for save-restore of all enclaves, in an example.

A first instruction, VMRAM_WR, may be a VMX-root instruction for writing VMM-specific NVRAM range in hardware. The attributes for this instruction may include a write address and write data. If the instruction is executed in VMX non-root mode of operation, then a GP fault may occur. A second instruction, VMRAM_RD, may be a VMX-root instruction for reading a VMM-specific NVRAM range in hardware. Attributes for this instruction may include a read address to fetch a read value. If the instruction is executed in VMX non-root mode of operation, a GP fault may occur.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates a logic flow 800 according to an embodiment. At 802, a processor may indicate to a trusted execution environment that a memory, such as an on-chip NVRAM, supports dedicated access to the trusted execution environment. As described herein, the TEE may be a SGX system or a VMM system, or other known TEEs. In some embodiments, VMM systems may implement virtual secure mode (VSM). The indication may be via a CPUID, which may be an identifier associated with a CPU, which may be sent from a controller to a TEE, or may have one or more flags indicating capabilities that may be discovered by a TEE via reading the appropriate flags.

In an embodiment, the memory may include a plurality of partitions, each of the plurality of partitions is statically associated with a particular TEE, and may be created by system BIOS. In this manner, a first TEE may be prevented from accidentally, or maliciously, accessing or corrupting secret data from another TEE co-located within the same on-chip NVRAM. Within a single on-chip NVRAM, memory ranges may be assigned to a particular TEE and an interface plugin of a NVRAM controller may be responsible for receiving instructions from one or more TEEs and enforcing access control policies.

At 804, a processor may receive an instruction from the trusted execution environment. The instruction may be specific to a particular TEE, such as described above with respect to FIGS. 6 and 7. In some embodiments, common instruction sets may be available across different types of TEEs. In any event, the instruction may include information associated with an access control policy, such as one or more of a trusted execution environment identifier, trusted execution environment instructions, and a range of memory locations associated with a trusted execution environment.

In turn, at 806, an interface plugin of a NVRAM controller may enforce an access control policy of an interface plugin to limit access of the memory by the trusted execution environment to a partition of the memory associated with the trusted execution environment. The interface plugin may enforce access control policies to limit read and write access of a TEE to a particular memory range within an on-chip NVRAM. In some embodiments, each TEE and associated memory partition may have an associated access control policy, and may have associated instruction sets. Likewise, in other embodiments, multiple TEEs, or types of TEEs, may share access control policies and/or instruction sets.

Figure 9:
FIG. 9 illustrates an article of manufacture according to an embodiment.

FIG. 9 illustrates an article of manufacture according to an embodiment. Storage medium 900 may comprise any computer-readable storage medium or machine-readable storage medium, such as an optical, magnetic or semiconductor storage medium. In some embodiments, storage medium 900 may comprise a non-transitory storage medium. In various embodiments, storage medium 900 may comprise an article of manufacture. In some embodiments, storage medium 900 may store computer-executable instructions, such as computer-executable instructions to implement logic flow 800, for example. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited to these examples.

Figure 10:
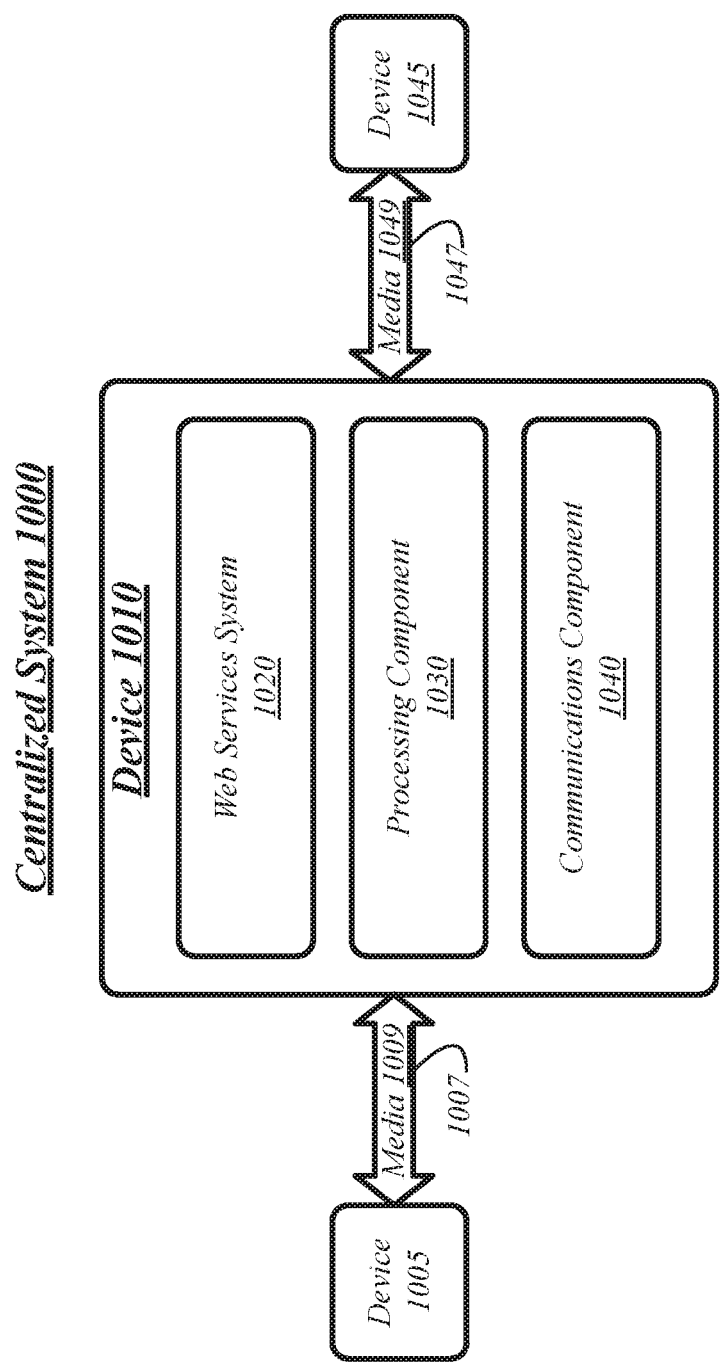
FIG. 10 illustrates an embodiment of a centralized system.

FIG. 10 illustrates a block diagram of a centralized system 1000. The centralized system 1000 may implement some or all of the structure and/or operations for the web services system 1020 in a single computing entity, such as entirely within a single device 1010.

The device 1010 may comprise any electronic device capable of receiving, processing, and sending information for the web services system 1020. Examples of an electronic device may include without limitation a client device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 1010 may execute processing operations or logic for the web services system 1020 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1010 may execute communications operations or logic for the web services system 1020 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1009, 1049 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1010 may communicate with other devices 1005, 1045 over a communications media 1009, 1049, respectively, using communications signals 1007, 1047, respectively, via the communications component 1040. The devices 1005, 1045, may be internal or external to the device 1010 as desired for a given implementation.

For example, device 1005 may correspond to a client device such as a phone used by a user. Signals 1007 sent over media 1009 may therefore comprise communication between the phone and the web services system 1020 in which the phone transmits a request and receives a web page or other data in response.

Device 1045 may correspond to a second user device used by a different user from the first user, described above. In one embodiment, device 1045 may submit information to the web services system 1020 using signals 1047 sent over media 1049 to construct an invitation to the first user to join the services offered by web services system 1020. For example, if web services system 1020 comprises a social networking service, the information sent as signals 1047 may include a name and contact information for the first user, the contact information including phone number or other information used later by the web services system 1020 to recognize an incoming request from the user. In other embodiments, device 1045 may correspond to a device used by a different user that is a friend of the first user on a social networking service, the signals 1047 including status information, news, images, contact information, or other social-networking information that is eventually transmitted to device 1005 for viewing by the first user as part of the social networking functionality of the web services system 1020.

Figure 11:
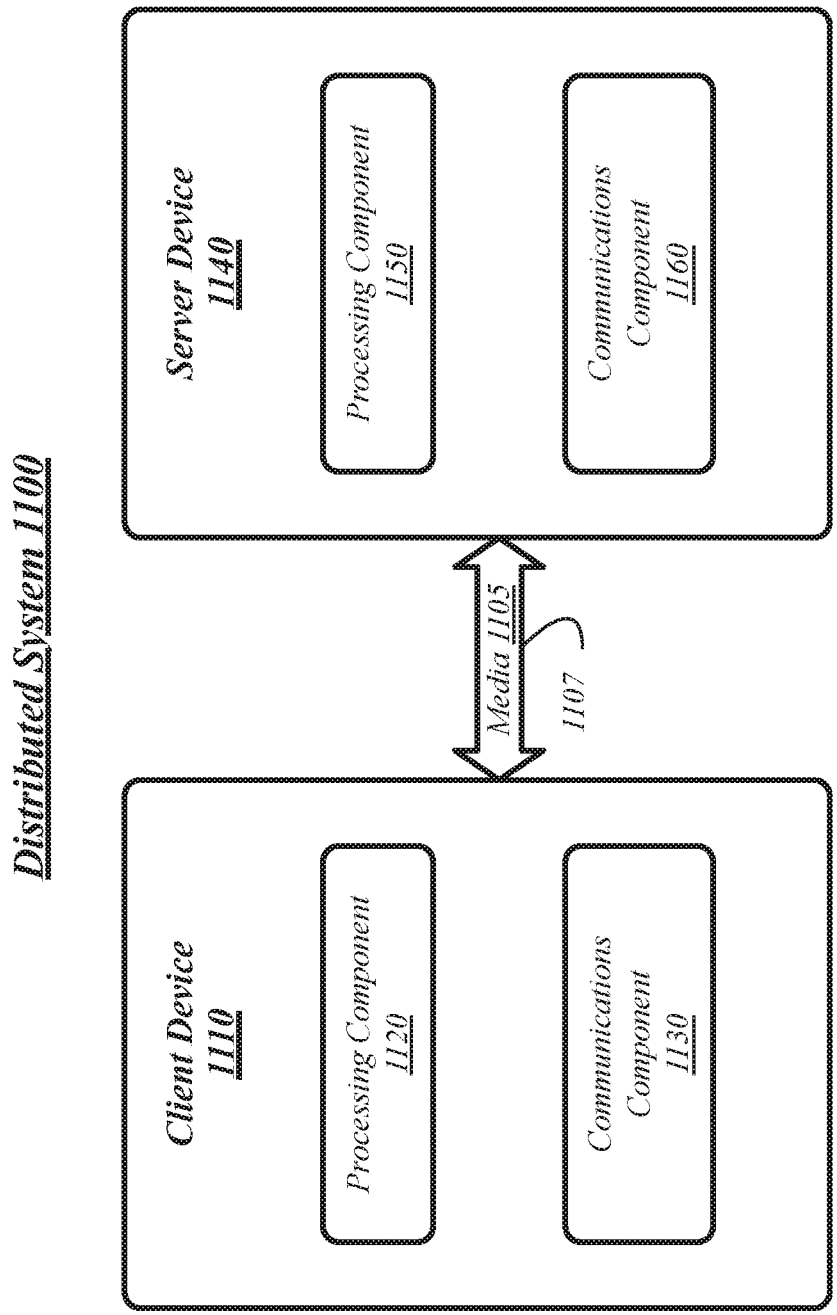
FIG. 11 illustrates an embodiment of a distributed system.

FIG. 11 illustrates a block diagram of a distributed system 1100. The distributed system 1100 may distribute portions of the structure and/or operations for the disclosed embodiments across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a client device 1110 and a server device 1140. In general, the client device 1110 and the server device 1140 may be the same or similar to the client device 1010 as described with reference to FIG. 10. For instance, the client system 1110 and the server system 1140 may each comprise a processing component 1120, 1150 and a communications component 1130, 1160, which are the same or similar to the processing component 1030 and the communications component 1040, respectively, as described with reference to FIG. 10. In another example, the devices 1110, 1140 may communicate over a communications media 1105 using communications signals 1107 via the communications components 1130, 1160.

The client device 1110 may comprise or employ one or more client programs that operate to perform various methodologies in accordance with the described embodiments. In one embodiment, for example, the client device 1110 may implement some steps described with respect to FIG. 8.

The server device 1140 may comprise or employ one or more server programs that operate to perform various methodologies in accordance with the described embodiments. In one embodiment, for example, the server device 1140 may implement some steps described with respect to FIG. 8.

Figure 12:
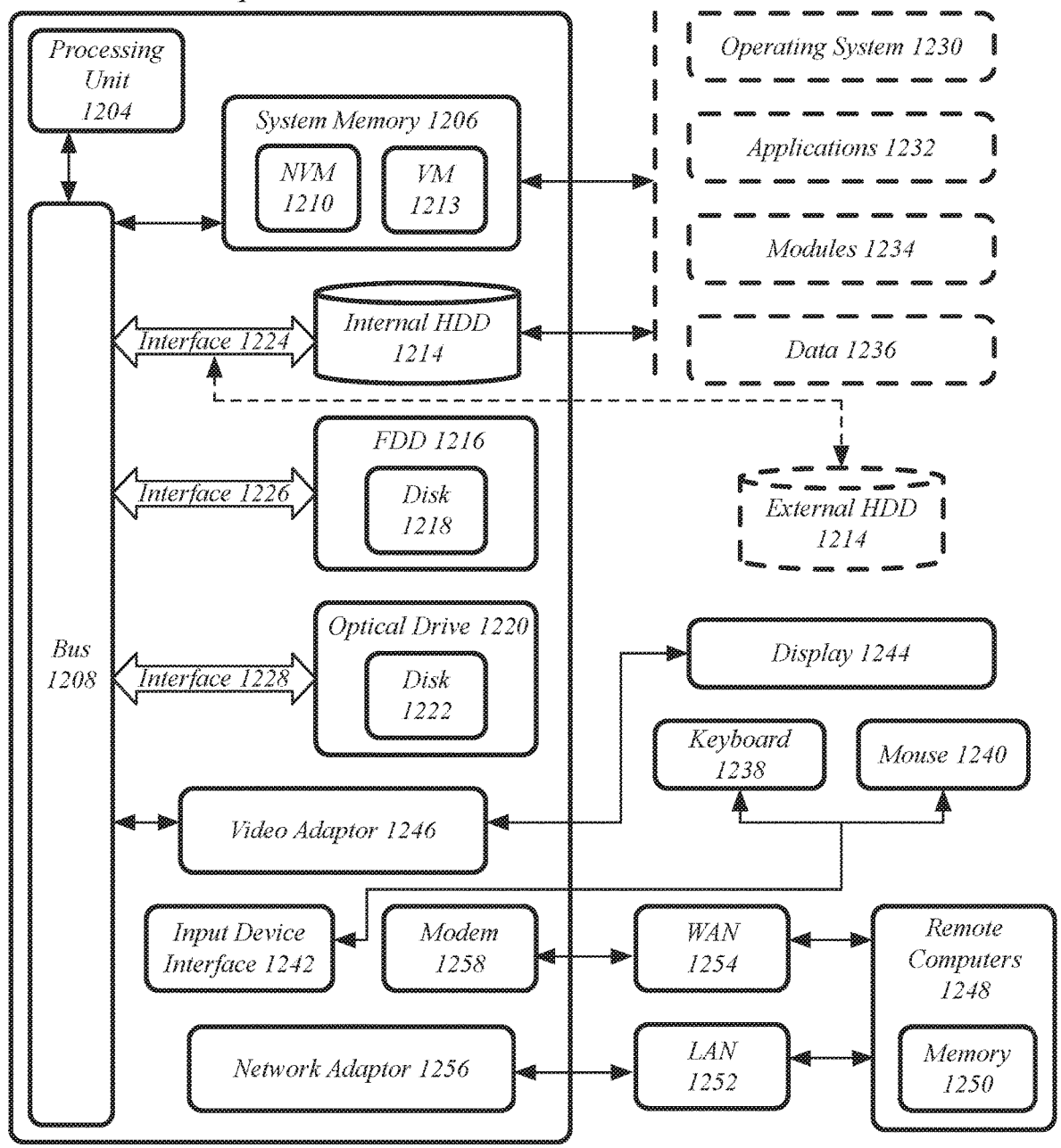
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1213. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1018, and an optical disk drive 1220 to read from or write to a removable optical disk 1222 (e.g., a CD-ROM, DVD, or Blu-ray). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1213, including an operating system 1230, one or more application programs 1232, other program modules 1234, and program data 1236. In one embodiment, the one or more application programs 1232, other program modules 1234, and program data 1236 can include, for example, the various applications and/or components to implement the disclosed embodiments.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A display 1244 is also connected to the system bus 1208 via an interface, such as a video adaptor 1246. The display 1244 may be internal or external to the computer 1202. In addition to the display 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
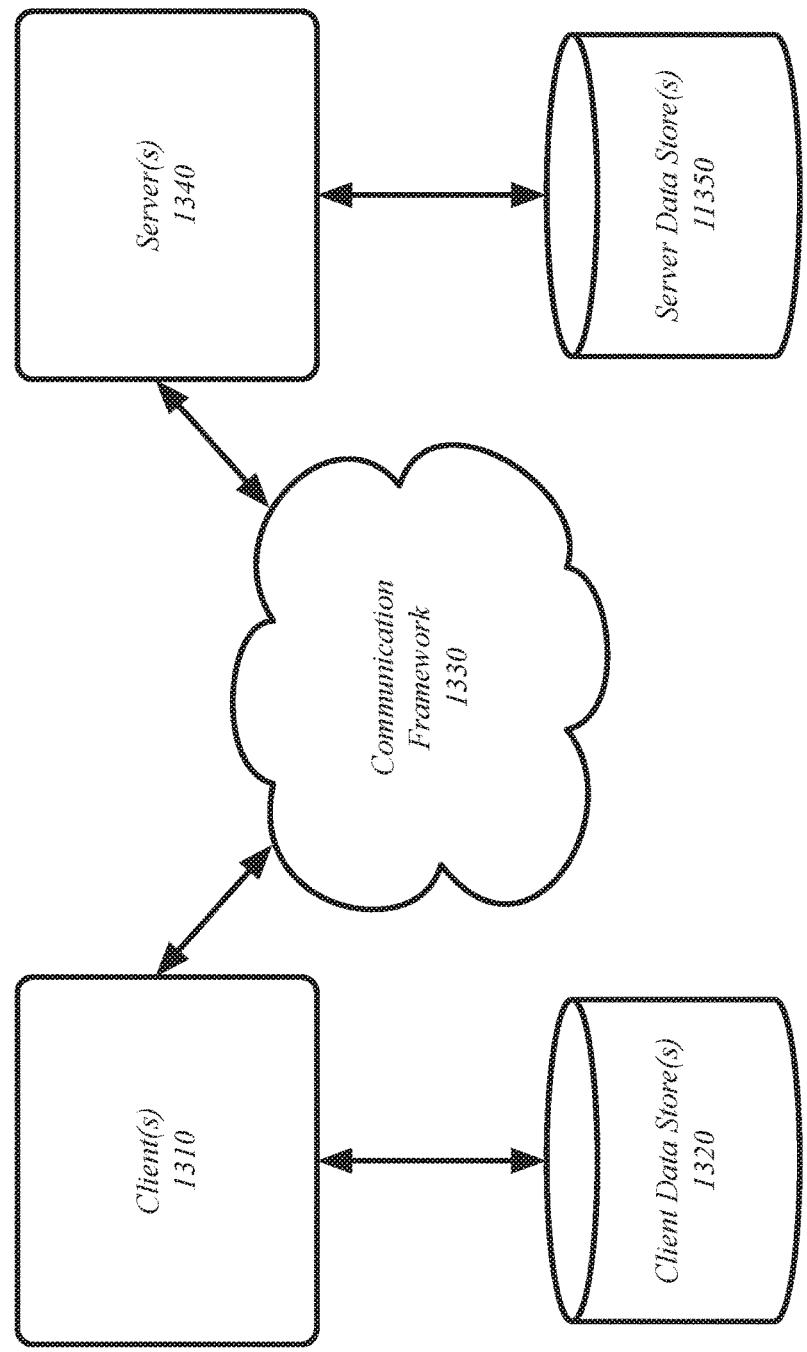
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1310 and servers 1340. The clients 1310 may implement the client device 1310, for example. The servers 1340 may implement the server device 1340, for example. The clients 1310 and the servers 1340 are operatively connected to one or more respective client data stores 1320 and server data stores 1350 that can be employed to store information local to the respective clients 1310 and servers 1340, such as cookies and/or associated contextual information.

The clients 1310 and the servers 1340 may communicate information between each other using a communication framework 1330. The communications framework 1330 may implement any well-known communications techniques and protocols. The communications framework 1330 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1330 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1310 and the servers 1340. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

Example 1

A system for interfacing a trusted execution environment with a memory, comprising: a processor including the memory configured to interface with the trusted execution environment, the processor configured to indicate to the trusted execution environment that the memory supports dedicated access to the trusted execution environment; receive an instruction from the trusted execution environment; and enforce an access control policy of an interface plugin to limit access of the memory by the trusted execution environment to a partition of the memory associated with the trusted execution environment.

Example 2

The system of Example 1, wherein the memory is a non-volatile random-access memory (NVRAM).

Example 3

The system of Example 1, wherein the partition of the memory associated with the trusted execution environment is created by a system BIOS.

Example 4

The system of Example 1, wherein the trusted execution environment is a software-guard extensions (SGX) system.

Example 5

The system of Example 1, wherein the trusted execution environment is a virtual machine manager (VMM) system.

Example 6

The system of Example 1, wherein the memory includes a plurality of partitions, each of the plurality of partitions is statically associated with a trusted execution environment.

Example 7

The system of Example 1, wherein the partition of the memory associated with the trusted execution environment includes save-restore information for one or more enclaves.

Example 8

The system of Example 1, wherein the access control policy is specifically associated with the trusted execution environment.

Example 9

The system of Example 1, wherein the access control policy is specifically associated with the partition of the memory associated with the trusted execution environment.

Example 10

The system of Example 1, wherein the access control policy includes a read instruction for reading data stored within the partition of the memory associated with the trusted execution environment.

Example 11

The system of Example 1, wherein the access control policy includes a write instruction for writing data to the partition of the memory associated with the trusted execution environment.

Example 12

The system of Example 1, wherein the access control policy includes one or more of a trusted execution environment identifier, trusted execution environment instructions, and a range of memory locations associated with a trusted execution environment.

Example 13

A computer implemented method for interfacing a trusted execution environment with a memory, comprising: indicating, by a processor, to the trusted execution environment that the memory of the processor supports dedicated access to the trusted execution environment; receiving an instruction from the trusted execution environment; and enforcing an access control policy of an interface plugin to limit access of the memory by the trusted execution environment to a partition of the memory associated with the trusted execution environment.

Example 14

The computer-implemented method of Example 13, wherein the memory is a non-volatile random-access memory (NVRAM).

Example 15

The computer-implemented method of Example 13, wherein the partition of the memory associated with the trusted execution environment is created by a system BIOS.

Example 16

The computer-implemented method of Example 13, wherein the trusted execution environment is a software-guard extensions (SGX) system.

Example 17

The computer-implemented method of Example 13, wherein the trusted execution environment is a virtual machine manager (VMM) system.

Example 18

The computer-implemented method of Example 13, wherein the memory includes a plurality of partitions, each of the plurality of partitions is statically associated with a trusted execution environment.

Example 19

The computer-implemented method of Example 13, wherein the partition of the memory associated with the trusted execution environment includes save-restore information for one or more enclaves.

Example 20

The computer-implemented method of Example 13, wherein the access control policy is specifically associated with the trusted execution environment.

Example 21

The computer-implemented method of Example 13, wherein the access control policy is specifically associated with the partition of the memory associated with the trusted execution environment.

Example 22

The computer-implemented method of Example 13, wherein the access control policy includes a read instruction for reading data stored within the partition of the memory associated with the trusted execution environment.

Example 23

The computer-implemented method of Example 13, wherein the access control policy includes a write instruction for writing data to the partition of the memory associated with the trusted execution environment.

Example 24

The computer-implemented method of Example 13, wherein the access control policy includes one or more of a trusted execution environment identifier, trusted execution environment instructions, and a range of memory locations associated with a trusted execution environment.

Example 25

An article comprising a non-transitory computer-readable storage medium that stores instructions for execution by processing circuitry of a computing device for interfacing a trusted execution environment with a memory, the instructions to cause the computing device to: indicate to the trusted execution environment that the memory of the processor supports dedicated access to the trusted execution environment; receive an instruction from the trusted execution environment; and enforce an access control policy of an interface plugin to limit access of the memory by the trusted execution environment to a partition of the memory associated with the trusted execution environment.

Example 26

The article of Example 25, wherein the memory is a non-volatile random-access memory (NVRAM).

Example 27

The article of Example 25, wherein the partition of the memory associated with the trusted execution environment is created by a system BIOS.

Example 28

The computer-implemented method of Example 13, wherein the trusted execution environment is a software-guard extensions (SGX) system.

Example 29

The computer-implemented method of Example 13, wherein the trusted execution environment is a virtual machine manager (VMM) system.

Example 30

The article of Example 25, wherein the memory includes a plurality of partitions, each of the plurality of partitions is statically associated with a trusted execution environment.

Example 31

The article of Example 25, wherein the partition of the memory associated with the trusted execution environment includes save-restore information for one or more enclaves.

Example 32

The article of Example 25, wherein the access control policy is specifically associated with the trusted execution environment.

Example 33

The article of Example 25, wherein the access control policy is specifically associated with the partition of the memory associated with the trusted execution environment.

Example 34

The article of Example 25, wherein the access control policy includes a read instruction for reading data stored within the partition of the memory associated with the trusted execution environment.

Example 35

The article of Example 25, wherein the access control policy includes a write instruction for writing data to the partition of the memory associated with the trusted execution environment.

Example 36

The article of Example 25, wherein the access control policy includes one or more of a trusted execution environment identifier, trusted execution environment instructions, and a range of memory locations associated with a trusted execution environment.

Example 37

A computing device for interfacing a trusted execution environment with a memory, comprising: means for indicating to the trusted execution environment that the memory of the processor supports dedicated access to the trusted execution environment; means for receiving an instruction from the trusted execution environment; and means for enforcing an access control policy of an interface plugin to

Example 38

The computing device of Example 37, wherein the memory is a non-volatile random-access memory (NVRAM).

Example 39

The computing device of Example 37, wherein the partition of the memory associated with the trusted execution environment is created by a system BIOS.

Example 40

The computing device of Example 37, wherein the trusted execution environment is a software-guard extensions (SGX) system.

Example 41

The computing device of Example 37, wherein the trusted execution environment is a virtual machine manager (VMM) system.

Example 42

The computing device of Example 37, wherein the memory includes a plurality of partitions, each of the plurality of partitions is statically associated with a trusted execution environment.

Example 43

The computing device of Example 37, wherein the partition of the memory associated with the trusted execution environment includes save-restore information for one or more enclaves.

Example 44

The computing device of Example 37, wherein the access control policy is specifically associated with the trusted execution environment.

Example 45

The computing device of Example 37, wherein the access control policy is specifically associated with the partition of the memory associated with the trusted execution environment.

Example 46

The computing device of Example 37, wherein the access control policy includes a read instruction for reading data stored within the partition of the memory associated with the trusted execution environment.

Example 47

The computing device of Example 37, wherein the access control policy includes a write instruction for writing data to the partition of the memory associated with the trusted execution environment.

limit access of the memory by the trusted execution environment to a partition of the memory associated with the trusted execution environment.

Example 48

The computing device of Example 37, wherein the access control policy includes one or more of a trusted execution environment identifier, trusted execution environment instructions, and a range of memory locations associated with a trusted execution environment.

Example 49

An apparatus for interfacing a trusted execution environment with a memory, comprising: at least one memory; at least one processor; and logic configured to interface the trusted execution environment with the memory, at least a portion of the logic comprised in hardware and executed by the at least one processor, the logic to: indicate to the trusted execution environment that the memory of the processor supports dedicated access to the trusted execution environment; receive an instruction from the trusted execution environment; and enforce an access control policy of an interface plugin to limit access of the memory by the trusted execution environment to a partition of the memory associated with the trusted execution environment.

Example 50

The apparatus of Example 49, wherein the memory is a non-volatile random-access memory (NVRAM).

Example 51

The apparatus of Example 49, wherein the partition of the memory associated with the trusted execution environment is created by a system BIOS.

Example 52

The apparatus of Example 49, wherein the trusted execution environment is a software-guard extensions (SGX) system.

Example 53

The apparatus of Example 49, wherein the trusted execution environment is a virtual machine manager (VMM) system.

Example 54

The apparatus of Example 49, wherein the memory includes a plurality of partitions, each of the plurality of partitions is statically associated with a trusted execution environment.

Example 55

The apparatus of Example 49, wherein the partition of the memory associated with the trusted execution environment includes save-restore information for one or more enclaves.

Example 56

The apparatus of Example 49, wherein the access control policy is specifically associated with the trusted execution environment.

Example 57

The apparatus of Example, wherein the access control policy is specifically associated with the partition of the memory associated with the trusted execution environment.

Example 58

The apparatus of Example 49, wherein the access control policy includes a read instruction for reading data stored within the partition of the memory associated with the trusted execution environment.

Example 59

The apparatus of Example 49, wherein the access control policy includes a write instruction for writing data to the partition of the memory associated with the trusted execution environment.

Example 60

The apparatus of Example 49, wherein the access control policy includes one or more of a trusted execution environment identifier, trusted execution environment instructions, and a range of memory locations associated with a trusted execution environment.

The invention claimed is:

1. A system, comprising:
a processor comprising processor circuitry and memory configured to interface with a plurality of trusted execution environments, the memory comprising a plurality of partitions, wherein a one of the plurality of partitions is statically associated with one of the plurality of trusted execution environments, the processor configured to:
indicate to a one of the plurality of trusted execution environments that the memory supports dedicated access to the one of the plurality of trusted execution environments;
receive an instruction from the one of the plurality of trusted execution environments; and
enforce an access control policy of an interface plugin, the access control policy to allow access to the one of the plurality of partitions associated with the one of the plurality of trusted execution environments by the one of the plurality of trusted execution environments and to restrict access to the one of the plurality of partitions by the other ones of the plurality of trusted execution environments.

2. The system of claim 1, wherein the memory is a non-volatile random-access memory (NVRAM).

3. The system of claim 1, wherein the one of the plurality of partitions of the memory associated with the one of the plurality of trusted execution environments is created by a system BIOS.

4. The system of claim 1, wherein the one of the plurality of trusted execution environments is a software-guard extensions (SGX) system.

5. The system of claim 1, wherein the one of the plurality of trusted execution environments is a virtual machine manager (VMM) system.

6. The system of claim 1, wherein the one of the plurality of partitions of the memory associated with the one of the plurality of trusted execution environments includes save-restore information for one or more enclaves.

7. The system of claim 1, wherein the access control policy includes a read instruction for reading data stored within the one of the plurality of partitions of the memory associated with the one of the plurality of trusted execution environments.

8. The system of claim 1, wherein the access control policy includes a write instruction for writing data to the one of the plurality of partitions of the memory associated with the one of the plurality of trusted execution environments.

9. The system of claim 1, wherein the access control policy includes one or more of a trusted execution environment identifier, trusted execution environment instructions, and a range of memory locations associated with the one of the plurality of trusted execution environments.

10. A computer implemented method for interfacing a plurality of trusted execution environments with a memory of a processor, the memory comprising a plurality of partitions, wherein a one of the plurality of partitions is statically associated with one of the plurality of trusted execution environments, comprising:
indicating, by the processor, to a one of the plurality of trusted execution environments that the memory of the processor supports dedicated access to the one of the plurality of trusted execution environments;
receiving an instruction from the one of the plurality of trusted execution environments; and
enforcing an access control policy of an interface plugin, the access control policy to allow access to the one of the plurality of partitions associated with the one of the plurality of trusted execution environments by the one of the plurality of trusted execution environments and to restrict access to the one of the plurality of partitions by the other ones of the plurality of trusted execution environments.

11. The computer-implemented method of claim 10, wherein the memory is a non-volatile random-access memory (NVRAM).

12. The computer-implemented method of claim 10, wherein the one of the plurality partitions of the memory associated with the one of the plurality trusted execution environments is created by a system BIOS.

13. The computer-implemented method of claim 10, wherein the one of the plurality trusted execution environments is a software-guard extensions (SGX) system.

14. The computer-implemented method of claim 10, wherein the one of the plurality trusted execution environments is a virtual machine manager (VMM) system.

15. The computer-implemented method of claim 10, wherein the access control policy includes a read instruction for reading data stored within the one of the plurality partitions of the memory associated with the one of the plurality trusted execution environments.

16. The computer-implemented method of claim 10, wherein the access control policy includes a write instruction for writing data to the one of the plurality partitions of the memory associated with the one of the plurality trusted execution environments.

17. The computer-implemented method of claim 10, wherein the access control policy includes one or more of a trusted execution environment identifier, trusted execution environment instructions, and a range of memory locations associated with a trusted execution environment.

18. An article comprising a non-transitory computer-readable storage medium that stores instructions for execution by processing circuitry of a computing device for interfacing a plurality of trusted execution environments with a memory, the memory comprising a plurality of partitions, wherein a one of the plurality of partitions is statically associated with one of the plurality of trusted execution environments, the instructions to cause the computing device to:
- indicate to a one of the plurality of trusted execution environments that the memory of the processing circuitry supports dedicated access to the one of the plurality of trusted execution environments;
- receive an instruction from the one of the plurality of trusted execution environments; and
- enforce an access control policy of an interface plugin, the access control policy to allow access to the one of the plurality of partitions associated with the one of the plurality of trusted execution environments by the one of the plurality of trusted execution environments and to restrict access to the one of the plurality of partitions by the other ones of the plurality of trusted execution environments.

19. The article of claim 18, wherein the memory is a non-volatile random-access memory (NVRAM).

20. The article of claim 18, wherein the one of the plurality of partitions of the memory associated with the one of the plurality of trusted execution environments is created by a system BIOS.

21. The article of claim 18, wherein the one of the plurality of trusted execution environments is a software-guard extensions (SGX) system or a virtual machine manager (VMM) system.

22. The article of claim 18, wherein the one of the plurality of partitions of the memory associated with the one of the plurality of trusted execution environments includes save-restore information for one or more enclaves.

23. The article of claim 18, wherein the access control policy includes a read instruction for reading data stored within the one of the plurality of partitions of the memory associated with the one of the plurality of trusted execution environments.

24. The article of claim 18, wherein the access control policy includes a write instruction for writing data to the one of the plurality of partitions of the memory associated with the one of the plurality of trusted execution environments.

25. The article of claim 18, wherein the access control policy includes one or more of a trusted execution environment identifier, trusted execution environment instructions, and a range of memory locations associated with the one of the plurality of trusted execution environments.

* * * * *